US010717113B2

(12) United States Patent
Baque et al.

(10) Patent No.: US 10,717,113 B2
(45) Date of Patent: Jul. 21, 2020

(54) MATERIAL HAVING A MARKER, AND METHOD FOR SORTING A MIXTURE OF MATERIALS

(71) Applicant: Polysecure GmbH, Freiburg (DE)

(72) Inventors: Thomas Baque, Freiburg (DE); Jochen Moesslein, Freiburg (DE)

(73) Assignee: Polysecure GmbH, Freiburg (DE)

( * ) Notice: Subject to any disclaimer, the term of this patent is extended or adjusted under 35 U.S.C. 154(b) by 0 days.

(21) Appl. No.: 14/386,437

(22) PCT Filed: Mar. 7, 2013

(86) PCT No.: PCT/DE2013/000127
§ 371 (c)(1),
(2) Date: Sep. 19, 2014

(87) PCT Pub. No.: WO2013/139320
PCT Pub. Date: Sep. 26, 2013

(65) Prior Publication Data
US 2015/0068955 A1 Mar. 12, 2015

(30) Foreign Application Priority Data

Mar. 21, 2012 (DE) ........................ 10 2012 005 542

(51) Int. Cl.
| | | |
|---|---|---|
| *B07C 5/342* | (2006.01) | |
| *G01N 21/64* | (2006.01) | |
| *B29B 17/02* | (2006.01) | |
| *C09K 11/08* | (2006.01) | |
| B29L 31/00 | (2006.01) | |
| B29K 27/06 | (2006.01) | |

(52) U.S. Cl.
CPC ............ *B07C 5/342* (2013.01); *B07C 5/3427* (2013.01); *B29B 17/02* (2013.01); *C09K 11/08* (2013.01); *G01N 21/64* (2013.01); *B07C 2501/0054* (2013.01); *B29B 2017/0203* (2013.01); *B29B 2017/0279* (2013.01); *B29K 2027/06* (2013.01); *B29K 2995/0018* (2013.01); *B29L 2031/005* (2013.01); *B29L 2031/778* (2013.01); *G01N 2021/6421* (2013.01); *Y02W 30/622* (2015.05)

(58) Field of Classification Search
CPC .................. B07C 5/342; B07C 5/3427; B07C 2501/0054; B29B 17/02; B29B 2017/0279; C09K 11/08; G01N 21/64; Y02W 30/622; B29K 2027/06
USPC ...... 209/3.1, 576–578, 580, 581; 252/301.36
See application file for complete search history.

(56) References Cited

U.S. PATENT DOCUMENTS

| | | | | |
|---|---|---|---|---|
| 4,347,125 | A * | 8/1982 | Di Giacomo | ............. B03B 1/04 209/3.3 |
| 5,201,921 | A | 4/1993 | Luttermann et al. | |
| 2003/0021998 | A1 | 1/2003 | Hubbard et al. | |
| 2009/0266991 | A1 * | 10/2009 | Evans | .................. G11B 23/281 250/362 |
| 2011/0261354 | A1 * | 10/2011 | Sinfield | ..................... G01J 3/02 356/301 |
| 2013/0082173 | A1 * | 4/2013 | Cadieux, Jr. | ........... G01N 21/94 250/301 |
| 2013/0320237 | A1 * | 12/2013 | Cadieux | ................. G01N 21/64 250/459.1 |
| 2014/0197335 | A1 * | 7/2014 | Jayasooriya | ........... G01N 21/65 250/459.1 |
| 2014/0262966 | A1 * | 9/2014 | Cadieux, Jr. | ............ B07C 5/342 209/3.3 |

FOREIGN PATENT DOCUMENTS

| | | |
|---|---|---|
| DE | 4231477 | 3/1994 |
| DE | 102006031534 | 1/2008 |

OTHER PUBLICATIONS

Spectroscopy & Materials Analysis (Oct. 9, 2017). Stokes and Anti-Stokes</i>. Retrieved from https://www.youtube.com/watch?v=zYVxsxphlJc (Year: 2017).*
XP002698810; "PVC Window Profile Recycling System", HAMOS, 2007. Retrieved from the Internet: URL:http://www.allcontrols.eo.uk/documents jrecycling/Allcontrols%20-%20EKS-Pixel%20%.
PCT/DE2013/000127; PCT International Search Report and Written Opinion of the International Searching Authority dated Jun. 13, 2013.

* cited by examiner

*Primary Examiner* — Charles A Fox
*Assistant Examiner* — Kalyanavenkateshware Kumar
(74) *Attorney, Agent, or Firm* — Renner, Otto, Boisselle & Sklar, LLP

(57) ABSTRACT

The present invention relates to a material, preferably a plastic material, comprising foreign substances, characterised in that the material further comprises fluorescent compounds, and a process for sorting a mixture of materials.

9 Claims, No Drawings

MATERIAL HAVING A MARKER, AND METHOD FOR SORTING A MIXTURE OF MATERIALS

CROSS-REFERENCE TO RELATED APPLICATIONS

The present application is a U.S. National Stage Application based on and claiming benefit of and priority under 35 U.S.C. § 371 to International Application No. PCT/DE2013/000127, filed 7 Mar. 2013, which in turn claims benefit of and priority to German Application No. 102012005542.0, filed 21 Mar. 2012, the entirety of each of which is hereby incorporated herein by reference.

TECHNICAL FIELD

The present invention relates to a material, preferably a plastic material, which contains foreign substances or has a specific composition and quality that ought to be separated in recycling processes.

BACKGROUND

Throughout the world, a number of plastic materials are known which, in addition to the plastic material, which is usually substantially organic, also contain mainly inorganic, fibrous or particulate or other foreign substances or have different compositions, which it is desirable to separate during recycling. One well-known example is plastic windows made of polyvinyl chloride material (PVC) which are reinforced by the addition of glass fibres or contain different additives.

Plastic materials, such as PVC, which are free of inorganic, fibrous, particulate or other foreign substances can be recycled in the well-known manner. Established processes for recycling used PVC plastic windows, PVC plastic profiles and corresponding production waste are known in the art.

On the one hand, however, if foreign substances are contained in the plastic material, they can disturb the treatment and recycling process to such an extent that recycling is no longer possible. This is principally due to the fact that a recycling step includes feeding the plastic material into an extruder and filter apparatuses. In the extruder, and also in the filter apparatuses, the foreign substances have a very abrasive effect, which results in very rapid damage to the extruder and the filters.

At the same time, there may be economic reasons and questions of product strategy that require all the formulations of a plastic material, such as PVC for window profiles, to be processed uniformly and jointly for re-use as recycled granules. In the case of glass-fibre-reinforced PVC, all the manufacturers of window profiles who used the recycled granules would have glass fibres in their PVC profiles, even though it is questionable whether that is economically desirable or suitable in terms of product strategy.

There is therefore a need in the art both to detect and to separate plastic materials containing foreign substances from those plastic materials which do not contain any foreign substances at the earliest possible stage at the beginning of a recycling process.

It is therefore an object of the present invention to develop the generic material, preferably plastic material, further in a way which overcomes the disadvantages of the prior art, especially in such a way that detection and screening can as far as possible be performed reliably at the beginning of a recycling process.

It is a further object of the invention to provide a process for sorting a mixture of materials, which mixture contains at least one material in accordance with the invention.

The first object is achieved by a material, preferably a plastic material, comprising foreign substances, characterized in that the material comprises at least one fluorescent compound.

In this context, it is preferable that the foreign substances are fibrous or particulate and are preferably selected from the group consisting of glass fibres, silica and mixtures thereof.

It is also proposed in accordance with the invention that the fluorescent compound comprises Anti-Stokes-crystals or -pigments.

One embodiment is characterised in that the fluorescent compound is blended into the material substantially homogeneously.

It is also preferable that the material is selected from the group consisting of polyvinyl chloride (PVC) and vinyl chloride copolymers.

It is also preferable that the material comprises PVC window frames, PVC profiles, PVC production waste and mixtures thereof.

It is further preferable that the fluorescent compound is present in a concentration of 10-200 ppm based on the total weight of the material.

It is particularly preferable that Anti-Stokes-crystals are present.

Anti-Stokes-crystals are known in the art. They can be excited to fluoresce by electromagnetic radiation. At very specific excitation energies, multi-photon processes can cause the generation of fluorescent radiation whose energy is higher than the excitation energy. With an excitation radiation in the IR range, for example, it is possible to generate visible radiation. For this to happen, the excitation radiation must exactly match the energy transitions of the crystal and must therefore be very narrow-band. If the excitation radiation is outside the effective range, the crystal reacts without fluorescence, or does not light up.

The second object is achieved by a process for sorting a mixture of materials, wherein the mixture comprises at least one inventive material, the process comprising the steps of: i) optionally coarsely and/or finely comminuting the materials, preferably to a size of 0.1-2.0 cm, ii) exciting at least one fluorescent compound in the inventive material; iii) detecting the inventive material containing the excited fluorescent compound; and iv) separating the detected inventive material from the other materials.

It is particularly preferable in this regard that the process is carried out in several stages, wherein different excitation energies are used in each stage in order to excite different fluorescent compounds each time and to screen out the materials containing the respective fluorescent compound.

DETAILED DESCRIPTION

It has surprisingly been found that fluorescent materials, preferably Anti-Stokes-crystals, can be used in the invention material, especially plastic material, as optical markers which can, when excited accordingly, be caused to fluoresce, thus indicating in a simple and reliable manner that the material under examination, right down to small particle sizes, contains certain foreign substances or is of a specific composition and should therefore be screened out. If the material or the individual particle does not glow (for example fluoresce) in a corresponding detection step, the detected materials can be subjected to reprocessing in accordance with the state of the art.

In addition, it has been found that the fluorescent materials used as optical markers, especially the Anti-Stokes-crystals, exhibit such chemical, thermal and UV stability that they can fulfil their function throughout the entire life cycle of the material, even if the material is processed in several recycling cycles.

Nor does the addition of fluorescent materials to the plastic material lead to any change in colour or metamerism, neither in the recycling step nor in the products made from them, such as PVC window frames, which are in no way impaired with regard to their overall properties by the addition of the fluorescent materials.

It should also be emphasised that the inventive material can be detected rapidly in a reprocessing process.

Because of the narrow-band excitation, the invention offers advantages over the state of the art, especially in the case of multi-stage sorting processes, if different Anti-Stokes-crystals, which fluoresce at different excitation energies or react with fluorescence, are used for the different material compositions to be separated. The separation can then be carried out in several stages. Each time, only those particles which react to a particular excitation wavelength by fluorescing are screened out. All the other particles are transported to the next sorting stage, where a different excitation wavelength is used, so that different particles are screened out.

The result is that with the process of the invention, it is not the usual case that a particular colour is used to screen the fluorescence or colour of particles to be screened, but rather the excitation wavelength and the fluorescence of particular particles, while all the other particles remain dark, or do not glow, respectively fluoresce. In order to detect and localise the particles, it is therefore always possible to use uniform and simple cameras.

With the markings known in the state of the art based on colours, the camera has to detect not only luminescence, but also a particular colour. With the markings known in the state of the art based on UV pigments, these first have to be excited on a broad-band basis, whereupon all the pigments luminesce, luminescing at different wavelengths. The camera then not only has to detect luminescence, but also to differentiate by wavelength or colour. The requirements for the camera are more sophisticated. The cameras have to be set to a different wavelength at each sorting station.

Further features and advantages of the inventive plastic material will become clear from the following detailed description of a preferred embodiment and its use in a recycling process.

Plastic material in accordance with the invention in the form of PVC window frames is delivered to a recycling plant together with PVC material which is free of preferably fibrous or particulate foreign substances. The entire material is first coarsely comminuted, which can be done with a hammer mill, for example. A preferred particle size after the coarse comminution step is about 0.2 to 2.0 cm.

The coarse comminution step can preferably be followed by a wet grinding step in order to achieve a better cleaning effect and thus better detection in a subsequent detection step.

After comminution, the ground material is examined with an optical detector, which, after excitation with energy of a suitable wavelength, can detect the fluorescent materials added as markers, preferably Anti-Stokes-crystals, by their glowing, respectively fluorescence, and the parts marked and detected because of that are screened out. Equipment for separating/screening out unwanted plastic parts is well-known in the art and is already in industrial use.

In the detection step, the fluorescent materials, preferably Anti-Stokes-crystals, are excited by a light source of a wavelength matched to the materials added, preferably using a laser with corresponding deflection optics.

The fluorescent materials may be detected by means of a camera system which is already present in conventional sorting lines.

The features of the invention disclosed in the above description and claims can be essential to implementing the invention in its various embodiments both individually and in any combination.

The invention claimed is:

1. A process for sorting a mixture of materials, wherein the mixture comprises at least one material comprising foreign substances or having a specific composition and quality and at least one Anti-Stokes fluorescent compound, the process comprising the steps of:
   i) optionally comminuting the materials;
   ii) exciting the at least one Anti-Stokes fluorescent compound in the at least one material;
   iii) detecting the at least one material fluorescing due to the exciting; and
   iv) separating the detected at least one material from other materials in the mixture of materials by screening out fluorescing material;
   characterized in that the detecting in step (iii) is by detection of fluorescence of the at least one Anti-Stokes fluorescent compound in the at least one material, wherein the Anti-Stokes fluorescent compound comprises Anti-Stokes-crystals or Anti-Stokes-pigments, wherein the Anti-Stokes fluorescent compound is blended into the at least one material homogeneously.

2. The process according to claim 1, characterised in that the process is carried out in several stages, wherein different excitation energies as used in each stage in order to excite different Anti-Stokes fluorescent compounds each time and to screen out the materials containing the respective Anti-Stokes fluorescent compound.

3. The process according to claim 1, characterised in that the at least one material is a plastic material.

4. The process according to claim 1, characterized in that the foreign substances are selected from the group consisting of glass fibres, silica and mixtures thereof.

5. The process according to claim 1, characterised in that the at least one material is selected from the group consisting of polyvinyl chloride (PVC) and vinyl chloride copolymers.

6. The process according to claim 5, characterised in that the at least one material comprises PVC window frames, PVC profiles, PVC production waste and mixtures thereof.

7. The process according to claim 1, characterized in that the foreign substances are fibrous or particulate.

8. The process according to claim 1, characterized in that the at least one material is comminuted in step i) to a size of 0.1-2.0 cm.

9. A process for sorting a mixture of materials, wherein the mixture comprises at least one material comprising foreign substances or having a specific composition and quality and at least one Anti-Stokes fluorescent compound, the process comprising the steps of:
   i) optionally comminuting the materials;
   ii) exciting the at least one Anti-Stokes fluorescent compound in the at least one material;

iii) detecting the at least one material fluorescing due to the exciting; and
iv) separating the detected at least one material from other materials in the mixture of materials by screening out fluorescing material;
characterized in that the detecting in step (iii) is by detection of fluorescence of the at least one Anti-Stokes fluorescent compound in the at least one material, wherein the Anti-Stokes fluorescent compound comprises Anti-Stokes-crystals or Anti-Stokes-pigments, wherein the Anti-Stokes fluorescent compound is present in a concentration of 10-200 ppm based on the total weight of the material.

\* \* \* \* \*